United States Patent Office 3,255,162
Patented June 7, 1966

3,255,162
MONOEPOXYBICYCLIC ACRYLATES AND METH-ACRYLATES AND THEIR POLYMERS
Ellington M. Beavers and Joseph L. O'Brien, Elkins Park, Pa., assignors to Rohm & Haas Company, Philadelphia, Pa., a corporation of Delaware
No Drawing. Filed Dec. 5, 1958, Ser. No. 778,287
15 Claims. (Cl. 260—86.1)

This invention concerns a group of new, valuable monomers, their polymers and a method for preparing the monomers. More specifically, this invention relates to new monoepoxybicyclic acrylates and methacrylates having a single oxirane oxygen bonded onto a six-membered bridged ring and having a methacryloyl radical, an acryloyl radical, a methacryloylmethyl radical or an acryloylmethyl radical bonded to the same six-membered bridged ring. These compounds are valuable reactive monomers.

The monomers of this invention may be represented by the following Formula I:

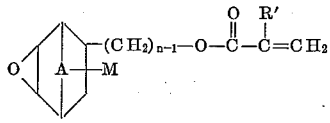

where M is selected from the group consisting of a hydrogen atom and a methyl group or a plurality thereof which may be bonded onto any carbon atom of the six-membered ring, R' is a hydrogen atom or a methyl group, $n$ is an integer having a value of 1 to 2, and A is preferably methylene.

Monomers in which A is a divalent saturated aliphatic hydrocarbon group other than methylene, such as propylene, tetramethylene, trimethylene, and the like, do not yet offer all the advantages of the monomers where A is methylene. M may also be alkyl groups higher than methyl.

When $n$ is an integer of two, typical monomers are
2-methacryloylmethyl-5,6-epoxybicyclo[2.2.1]heptane,
2-methylacryloylmethyl-2-methyl-5,6-epoxybicyclo[2.2.1]heptane,
2-methacryloylmethyl-6-methyl-5,6-epoxybicyclo[2.2.1]heptane,
2-methacryloylmethyl-4-methyl-5,6-epoxybicyclo[2.2.1]heptane,
2-methacryloylmethyl-7-methyl-5,6-epoxybicyclo[2.2.1]heptane,
2-methacryloylmethyl-2,5-dimethyl-5,6-epoxybicyclo[2.2.1]heptane,
2-acryloylmethyl-5,6-epoxybicyclo[2.2.1]heptane,
2-acryloylmethyl-2-methyl-5,6-epoxybicyclo[2.2.1]heptane,
2-acryloylmethyl-4,6-dimethyl-5,6-epoxybicyclo[2.2.1]heptane, and the like.

Where $n$ is an integer of one, typical monomers are
2-methacryloyl-5,6-epoxybicyclo[2.2.1]heptane
2-methacryloyl-3-methyl-5,6-epoxybicyclo[2.2.1]heptane,
2-methacryloyl-5-methyl-5,6-epoxybicyclo[2.2.1]heptane,
2-methacryloyl-1-methyl-5,6-epoxybicyclo[2.2.1]heptane,
2-acryloyl-5,6-epoxybicyclo[2.2.1]heptane, and the like.

The monomers of our invention may be prepared from compounds which may be represented by generic Formula II

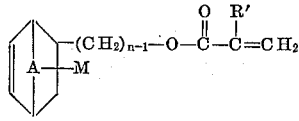

where M, R', $n$, and A are defined above.

Typical starting compounds for the monomers of this invention include
2-methacryloylmethylbicyclo[2.2.1]hept-5-ene,
2-methacryloylmethyl-2-methylbicyclo[2.2.1]hept-5-ene,
2-methacryloyl-3,6-dimethylbicyclo[2.2.1]hept-5-ene,
2-methacryloyl-5-methylbicyclo[2.2.1]hept-5-ene,
2-acryloyl-7-methylbicyclo[2.2.1]hept-5-ene,
2-acryloylbicyclo[2.2.1]hept-5-ene,
2-methacryloylbicyclo[2.2.1]hept-5-ene,
2-methacryloyl-3-methylbicyclo[2.2.1]hept-5-ene,
2-methacryloyl-2,5-dimethylbicyclo[2.2.1]hept-5-ene,
2-acryloylmethylbicyclo[2.2.1]hept-5-ene,
2-acryloyl-2-methylbicyclo[2.2.1]hept-5-ene, and the like.

In accordance with this invention, typical starting materials, such as those described above, are reacted by intimately contacting with an epoxidizing peracid under particular conditions, further detailed below. Preferred epoxidizing peracids which are useful for treating compounds typified by Formula II include perbenzoic acid, monoperphthalic acid, and peracetic acid. The peracids are conveniently employed in a suitable organic solvent which should also be a solvent for the starting material and the final product. More specially, the solvent should be inert to the action of the peracid and should desirably have a boiling point not exceeding 100° C. Typical suitable solvents include chloroform, acetic acid, ethyl acetate, and the like. At the present, peracetic acid is specially preferred since it appears to be particularly well suited to carry out the process of this invention. The amount of epoxidizing peracid which is employed in our invention to best carry out the epoxidation of compounds complying with Formula II ranges from about 1.0 to 1.5 moles and, more desirably from 1.05 mole to 1.5 moles of starting diunsaturated compound of Formula II. Unexpectedly, when larger amounts of peracid are used, such as two moles of peracid, there is not obtained a diepoxide, as one might expect, but a reduced yield of monoepoxide ester. Amounts of peracid less than one mole per mole of diunsaturated compound of Formula II generally result in a less efficient reaction.

The epoxidation between the peracid and compounds of Formula II is preferably carried out within a temperature range from about 20° to 50° C., preferably in the range of 30° to 40° C.

In a preferred embodiment of this invention, there is present during the epoxidation a basic agent which is ionizable and substantially water soluble. The basicity of the agent should be such that in a 0.1 normal concentration of water it imparts thereto a pH of at least 8, at 25° C. It has been noted that the presence of such a basic agent during the epoxidation apparently has a beneficial effect on limiting the introduction of the epoxy group to the desired position in the alcohol portion of the esters of this invention.

Typical basic agents that may be used in our invention include the oxides and hydroxides of the alkali metals, such as sodium hydroxide, potassium hydroxide, lithium oxide, and the like, as well as the salts of the alkali metals and weak aliphatic carboxylic acids, exemplified by sodium acetate, potassium carbonate, lithium carbonate, and the like. The oxides and hydroxides of the alkaline earth metals are likewise operable as typified by lime, zinc oxide, barium oxide, and the like. The sodium and potassium salts of the particular acids, which are predecessors of the peracids employed, are very effective in controlling the epoxidation and, therefore, often sodium acetate is favored. For best results, the basic agents are employed in an amount from 0.5 to 10%, preferably from about 2.5 to 6.5% by weight of the peracid solution used. The specified basic agent may be used alone or in mixtures with one another. The addition of the basic agent may be made at any convenient time to either one or to both reactants. It may be made all at once or incrementally.

When the prescribed conditions are observed, an epoxide group is introduced into the unsaturation of the six-membered ring, whereas the vinyl unsaturation in the side-chain is consistently preserved intact. It may be noted that contrary to expectations, the presence of a polymerization inhibitor for the acrylates and methacrylates during the epoxidation is merely optional. In spite of the presence of active oxygen and peracid, no perceptible polymerization occurs under the conditions specified. If, however, it should be desired to add a polymerization inhibitor during the epoxidation, any inhibitor for vinyl compounds is suitable, the following inhibitors being particularly well-suited in the present case: p-hydroxydiphenylamine, N,N'-diphenylphenylenediamine, 2,5-di-tert-butylhydroquinone, di-β-naphthol, 2,2'-bis-(p-hydrophenyl(propane, and more especially, N,N'-di-2-(1,4-naphthoquinonyl)-p-phenylenediamine. These polymerization inhibitors may be used in an amount ranging from about 0.1 to about 5% and preferably in the range from about 0.5 to 2% based on the weight of the starting ester. The use of a polymerization inhibitor during the epoxidation reaction itself may have a practical advantage when it is desired to further purify the monomeric products resulting from the present method. For a suitable purification, such as by distillation, which follows the epoxidation, the use of a polymerization inhibitor is advisable to minimize losses of the valuable products of this invention. For such purposes, the polymerization inhibitors illustrated above may conveniently be employed.

The starting bicyclomonoethylenic acrylates and methacrylates for this invention may be prepared by acid-catalyzed esterification or base-catalyzed transesterification of suitable bicyclicmonoethylenic alcohols. Such alcohols may be prepared conveniently by a Diels-Alder reaction. They may be adducts of β,γ-unsaturated alcohols, such as allyl alcohol, methallyl alcohol, or crotyl alcohol and a conjugated cyclic diene, such as cyclopentadiene, cyclohexadiene, 1,3,5,-tetramethylcyclo hexadiene, 3,6-dimethylcyclohexadiene, 2-methylcyclopentadiene, and similar others.

These bicyclic monounsaturated alcohols may be esterified, preferably in the presence of an acid catalyst, with excess glacial methacrylic or acrylic acid in an inert solvent, in the presence of a polymerization inhibitor. Alternatively, by known procedures, the esters may be prepared by base-catalyzed transesterification of the monoolefinic alcohols with an ester of acrylic or methacryic acid in the presence of a polymerization inhibitor. The olefinic alcohols may also be reacted with acrylic or methacrylic anhydrides or with arcyloyl or methacryloyl chlorides, preferably in the presence of an HCl-acceptor, to yield the desired diethylenically unsaturated esters. For the transesterification there may be used such typical esters as methyl methacrylate, methyl acrylate, ethyl acrylate, ethyl methacrylate, isobutyl methacrylate, hexyl methacrylate, and 2-ethylhexyl acrylate. Among those esters, the lower alkyl esters are preferred since the azeotrope formed therewith is removed with greater ease during transesterification.

In accordance with a preferred embodiment of this invention, monomers which comply with Formula I are prepared by charging an ester corresponding to Formula II to a suitable reactor equipped with an agitator, cooling and heating means, a temperature recorder, a reflux condenser, and an addition tube. The ester is gradually heated to within a temperature range of about 30° to 40° C. and while agitating, a 40% peracetic acid solution in acetic acid is gradually added to the ester in an amount totalling 1.05 mole. As addition of peracetic acid progresses a modest exotherm occurs and as the temperature tends to rise, cooling is applied to maintain the temperature within the range of 30° to 40° C. The rate of epoxidation is followed by periodic analyses of the unconsumed peracetic acid. When peracetic acid utilization has fallen to a negligible rate, the reaction is substantially completed. At that time, about 91 to 96% of the theoretical amount of peracetic acid has been utilized. This normally occurs after four to five hours. The reaction mixture is then diluted with water and separated into an aqueous and an organic phase with the assistance of a water-immiscible organic solvent.

Suitable water-immiscible organic solvents for this purpose include aliphatic and aromatic hydrocarbons, such as benzene, toluene, xylene, cumene, tetrahydronaphthalene, cyclohexane, n-hexane, and the like; chlorinated hydrocarbons, such as chloroform, carbon tetrachloride, trichloroethylene, ethylenedichloride, and the like; ethers, such as ethyl ether, amyl ether, and the like.

In order to obtain a faster and more complete separation of the organic phase, the aqueous phase may be saturated with a suitable salt, such as sodium chloride, sodium sulfate, or potassium sulfate. The organic solvent extract is then treated to remove any residual acid and the monoepoxybicycloacrylate is isolated by a suitable method, such as by stripping off the solvent under vacuum. In order to obtain the products of this invention in a highly purified state and to minimize the formation of a polymeric material, it is preferable to employ a polymerization inhibitor. Suitable typical vinyl polymerization inhibitors include phenyl-α-naphthylamine, N,N'-di-2-naphthyl-p-phenylenediamine, p-hydroxydiphenylamine, N,N' - diphenylphenylenediamine, 2,5-di-tert-butyl-hydroquinone, di - β - naphthol, 2,2'-bis(p-hydroxyphenyl)propane, N,N' - di - 2-(1,4-naphthoquinonyl)-p-phenylenediamine, and the like. Suitable amounts range from about 0.1 to 5%, preferably 0.5 to 2%, by weight of the acrylate.

In a further refinement of the preferred embodiment of this invention, there may be employed in the epoxidation a basic compound, such as sodium acetate, jointly with peracetic acid. Where this is desirable, the sodium acetate is employed in an amount of 3% by weight of the peracetic acid solution.

When the conditions specified above are carefully followed, there are obtained in accordance with this invention the useful and valuable monoepoxybicycloacrylates of this invention. These are reactive monomers which, by virtue of their unique structure, are endowed with surprising and unexpected properties which are further described below.

Preferred methods for preparing the useful monomers of this invention are illustrated by the following examples which are not to be construed as limiting the scope of this invention but are merely illustrative thereof. All parts are by weight unless specified to the contrary.

*Example 1*

In a 300 ml. 3-necked flask equipped with a stirrer, a thermometer, an addition funnel, and a condenser with dry tube, there are placed 60 parts of 2-methacryloylbicyclo[2.2.1]hept-5-ene and 1.0 part of a polymerization inhibitor, N,N' - di-2-(1,4-naphthoquinonyl)-p-phenylenediamine. A solution of 64.5 parts of 40% peracetic acid in glacial acetic acid and 1.9 parts of anhydrous sodium acetate are added while mixing at 40° to 45° C. for 30 minutes. Agitation within that temperature range is actively maintained for three hours after which time 90% of the peracetic acid is consumed. The reaction mixture is diluted with 100 ml. of water, saturated with sodium chloride, and extracted three times with 100 parts of benzene. The benzene extract is washed twice with a brine solution and dried over magnesium sulfate. The solution is filtered and the benzene distilled at 120 ml. of mercury through a 30 cm. Vigreux column. The product is 2 - methacryloyl-5,6-epoxybicyclo[2.2.1]heptane. It is distilled in the presence of about 2% of N,N'-di-2-(1,4- naphthoquinonyl)-p-phenylenediamine at 78° to 85° C. at 0.25 mm. The analysis shows 67.8% carbon (theoretical 68.0%) and 7.2% hydrogen (theoretical 7.2%).

The same product is obtained by using a 46% solution of peracetic acid in acetic acid.

The experiment is carried out again using instead of sodium acetate each one of the following compounds: sodium hydroxide, potassium carbonate, zinc oxide, and potassium acetate. The same product is obtained when these basic compounds are used in combination with each other.

Example 2

2 - methacryloyl-5,6-epoxybicyclo[2.2.1]heptane is prepared from 2 - methacryloylbicyclo[2.2.1]hept - 5-ene by reaction with a 10% solution of monoperphthalic acid in ether. The reaction is carried out in a temperature of 25° to 30° C. The product is separated in the manner described above.

Example 3

In similar equipment to that used in Example 1, there are mixed 28.8 parts of 2-methacryloylmethylbicyclo-[2.2.1]hept-5-ene and 28.6 parts of a 40% peracetic acid in glacial acetic acid. Stirring and heating within a temperature range of 40° to 50° C. is maintained for four hours. At that time, over 90% of the peracetic acid is found to have been consumed. The reaction mixture is extracted with 150 parts benzene and the benzene extract is washed with a saturated solution of sodium chloride. Excess solvent is stripped at reduced pressure and 2-methacryloylmethyl-5,6-epoxybicyclo[2.2.1]heptane is obtained in good yields.

2 - methacryloylmethyl-5,6-epoxybicyclo[2.2.1]heptane is again obtained when 2-methacryloylmethylbicyclo-[2.2.1]hept-5-ene is treated with a 5% perbenzoic solution in chloroform at 20° C.

Example 4(a)

A 300 ml. three-necked flask is equipped with a stirrer, thermometer, addition funnel, and a condenser with drying tube. In it there are placed 30.9 parts of 2-methacryloylmethyl - 2-methylbicyclo[2.2.1]hept - 5 - ene. A solution of 28.6 parts of 40% peracetic acid in glacial acetic acid is added in one hour at a temperature of 35° C. The consumption of peracetic acid is followed by periodic analyses and after three hours it is found to have been consumed in amount of over 90%. The organic phase of the reaction mixture is separated with benzene. The benzene extract is washed, dried, and then distilled in the presence of 1% of N,N'-diphenylphenylenediamine as polymerization inhibitor. The product which is collected is identified as 2-methacryloylmethyl-2-methyl-5,6-epoxy-bicyclo[2.2.1]heptane. It is a useful monomer.

Following the same procedure, 2-methacryloylmethyl-3,6 - dimethyl-5,6-epoxybicyclo[2.2.1]heptane is obtained from the originally unsaturated compound. It, too, is valuable in polymerization reactions.

Example 4(b)

Following the procedure of 4(a), 30.9 parts of 2-methacryloylmethyl-5-methylbicyclo[2.2.1]hept-5-ene are reacted at 20° C. with a 5% solution of perbenzoic acid in chloroform. After the epoxidation is termintaed, 2-methacryloylmethyl-5-methyl-5,6 - epoxybicyclo[2.2.1]heptane is extracted from the organic portion.

Example 4(c)

Fifty-nine and eight tenths parts of 2-acryloylmethyl-7-methylbicyclo[2.2.1]hept-5-ene are reacted with 96.7 parts (1.5 moles) of a 40% peracetic acid solution in acetic acid in the presence of 2 parts of anhydrous sodium acetate. The reacting temperature is maintained at about 40° C. When peracetic acid utilization has decreased to a negligible extent, the aqueous phase of the reaction product is discarded and from the organic phase there is collected by distillation in the presence of N,N-di-2-(1,4-naphthoquinoyl)p-phenylenediamine a satisfactory yield of 2-acryloylmethyl-7-methyl-5,6-epoxybicyclo[2.2.1]heptane.

Example 4(d)

In the same manner, 2-methacryloylmethyl-1-methyl-bicyclo[2.2.1]heptane is reacted at 40° C. with 28.6 parts of 40% peracetic acid solution to yield 2-methacryloylmethyl-1-methyl-5,6-epoxybicyclo[2.2.1]heptane.

Example 5

Twenty-six and five tenths parts of 2-acryloylmethyl-bicyclo[2.2.1]hept-5-ene are reacted in a flask as equipped in the prior examples with 64.5 parts of 40% peracetic acid in glacial acetic acid in the presence of 2 parts of anhydrous sodium acetate. The reaction is continued for 35 minutes at 45° C. while maintaining vigorous agitation. After three hours when most of the peracetic acid is consumed, the organic fraction of the reaction mixture is washed with sodium chloride and dried. The solution is filtered and the solvent is distilled under reduced pressure. The product is 2-acryloylmethylbicyclo[2.2.1]hept-5-ene. It is a valuable monomer for treating textiles.

The same procedure is followed except that the product treated is 2-acryloylmethyl-2-methylbicyclo[2.2.1]hept-5-ene to give 2-acryloyl-2-methyl-5,6-epoxybicyclo[2.2.1]heptane.

In a further experiment, peracetic acid solution is replaced by monoperphthalic acid solution in ether. The reaction is carried out at 30° C. The same product as in Example 5 is obtained.

Example 6(a)

Sixty-two and one tenth parts of 2-methacryloyl-3-methylbicyclo[2.2.1]hept-5-ene are reacted with 72 parts of 40% peracetic acid in glacial acetic acid in the presence of 2 parts of anhydrous sodium acetate and 1 part of N,N-di-2-(1,4-naphthoquinoyl)-p-phenylenediamine. Agitation is maintained for two hours at 45° C. at the end of which time benzene is added and the organic extract is washed with sodium chloride. The extract is filtered and benzene is distilled off at reduced pressures. The product obtained is 2-methacryloyl-3-methyl-5,6-epoxybicyclo [2.2.1]heptane.

Example 6(b)

In a similar manner, 2-methacryloyl-2,5-dimethyl-5,6-epoxybicyclo[2.2.1]heptane is obtained in comparable yields from the corresponding unsaturated methacrylate.

Example 6(c)

Example 6(a) is repeated using instead of sodium acetate, sodium hydroxide or potassium carbonate in equivalent amounts to the amount of sodium acetate used. The same products are obtained in good yields.

In a similar manner, the other reactive monomers of this invention are obtained.

The monoepoxybicyclic acrylates and methacrylates of this invention are valuable reactive monomers which polymerize to form homopolymers and to form copolymers with suitable other reactive monomers. The monomers of this invention are useful in dimensional stabilization of textiles with aqueous emulsions in which the monomers of this invention are an essential ingredient. In all of these valuable applications, the present monomers benefit from distinct and unexpected advantages which are radical departures from common monoepoxy-acrylates. One of these advantages is that it has been found that the present monomers are totally free from irritating and toxic effects on mammalian skin. This unexpected feature is demonstrated by skin patch tests on rabbits with a typical monomer of this invention; 2-methacryloylmethyl-5,6-epoxyheptane. The unexpected freedom of toxicity of typical monomers of this invention is a significant advantage in the preparation of homopolymers and copolymers. The harmlessness of the present monomers is an especially valuable attribute in the stabilization of textiles with aqueous emulsion mixtures comprising the present reactive monomers.

Combined with these advantages, the monomers of this invention offer a group of valuable polymers which may be made to polymerize under judiciously selected conditios either through the vinyl unsaturation or through the epoxy group. A very valuable aspect of these monomers is the advantage resulting from an unusually great differential in order of reactivity between the vinyl and the epoxy groups. This differential of reactivity permits a significantly greater flexibility in the selection of copolymers. By a suitable choice of catalyst and reaction conditions, the monomers may be made to polymerize primarily through the epoxy group or through the vinyl group. This different order of reactivity for polymerization may be taken advantage of by proper selection of conditions for polymerizing the monomers of this invention by themselves to form homopolymers or even more advantageously with polymerizable vinylidene compounds to form valuable linear copolymers. These polymers, including both the homopolymers and the copolymers, are adapted to be insolubilized by a cross-linking operation at the epoxy groups to produce novel hard casts, sheets, rubbery or hand films of great value as protective coatings particularly for wood and metals.

Typical of the polymerizable vinylidene or monoethylenically unsaturated compounds that may be employed to produce copolymers include vinyl ethers, such as vinyl ethyl ether, vinyl butyl ether, vinyl octyl ether, vinyl dodecyl ether, or vinyl stearyl ether; allyl ethers, such as allyl butyl ether, allyl vinyl ether, allyl octyl ether, or allyl decyl ether; acrylates, such as methyl acrylate, ethyl acrylate, butyl acrylate, octyl acrylate, or stearyl acrylate; methacrylates, such as methyl methacrylate, ethyl methacrylate, butyl methacrylate, or octyl methacrylate; acrylamides or methacrylamindes, such as methyl acrylamide, methyl methacrylamide, butyl acrylamide, or butyl methacrylamide; vinyl esters, such as vinyl acetate, vinyl butyrate, or vinyl stearate; allyl esters, such as allyl butyrate, allyl palmitate, or allyl stearate; maleates, such as butyl maleate, octyl maleate, or dodecyl maleate; itaconates, such as octyl itaconate, dodecyl itaconate, or octadecyl itaconate; styrenes, such as styrene, or vinyl toluene, or maleic anhydride, acrylonitrile or the like.

The amount of the compound of Formula I in the copolymers of this invention may be widely varied. Amounts in the range of 5% to 95% have yielded highly satisfactory results in forming insoluble, cross-linked coatings. The remainder may comprise one or more of the other polymerizable vinylidene compounds previously mentioned. Preferred copolymers are those comprising from 5 to 20 mole percent of at least one monomer of Formula I. A preferred group of comonomers is that comprising the alkyl esters of acrylic and methacrylic acids having from 1 to 18 carbon atoms in the alkyl group.

A group of very special interest are terpolymers which may be formed into novel hard thermo-plastic sheets. Such terpolymers advantageously comprise acrylic or methacrylic acids, methyl methacrylate or methyl acrylate, and at least one monomer of this invention in the following range of proportions: 1 to 10, 98 to 80, and 1 to 10, respectively.

For polymerization, predominantly at the vinyl group, the presence of a catalyst system of the redox type is suggested. Suitable combinations of oxidizing agents and reducing agents, such as potassium persulfate and sodium metabisulfite are advantageously employed. Other suitable oxidizing agents include the per salts, such as the alkali metal and ammonium persulfates and perborates, hydrogen peroxide, organic hydroperoxides such as tert-butyl hydroperoxide and cumene hydroperoxide, and esters such as tert-butyl perbonzate. Other reducing agents include water-soluble thiosulfates and hydrosulfites and the salts, such as the sulfates, of metals which are capable of existing in more than one valence state, such as cobalt, iron, nickel, and copper. Other catalysts include acetyl peroxide, benzoyl peroxide, tert-butylhydroperoxide, phthaloyl peroxide, succinoyl peroxide, as well as fatty oil acid peroxides, e.g., coconut oil acid peroxides, lauroyl peroxide, stearoyl peroxide, and oleoyl peroxide; alcoholic peroxides, e.g., tert-butylhydroperoxide, and similar others.

Examples of catalyst which may be advantageously utilized for inducing polymerization primarily through the epoxide group there may be suggested tert-toluene, sulfonic acid, sulfuric acid, phosphoric acid, aluminum chloride, stannic chloride, ferric chloride, boron trifluoride, boron trifluoride-ethyl ether complex, iodine, and the like.

In view of the two reactive groups of the monomers of Formula I, the polymerization, including the copolymerization, method of the present invention is essentially a two-stage operation. As a primary or first stage, there is carried out homopolymerization of a compound of Formula I or copolymerization between a compound of the general Formula I and a polymerizable vinylidene compound, by uniting the monomer or monomers, preferably, but not necessarily, through the agency of a polymerization catalyst or initiator, which primarily accelerates polymerization through the vinyl group, such as the catalysts set forth above.

In polymerizing the novel compounds of this invention, first primarily through the vinyl group there is a significantly decreased danger of gelation than with other common epoxyacrylates. As a result, there is a considerable gain in the type of operations and type of polymers which can be derived from the monomers of Formula I.

The polymerization may be conducted as a bulk, solution, or dispersion process, as desired. It is preferable that the polymerization be conducted in the temperature range of 0° to 125° C. and it is necessary that the temperature does not exceed about 130° C. Appreciably above 130° C., undesirable side reactions may occur which would interfere with the desired copolymerization process. The primary or first stage in the instant polymerization process results in a linear type homopolymer or copolymer that is soluble in organic solvents such as toluene, β-ethoxyethyl acetate, or the like. In this respect, another valuable aspect of the polymers of this invention is that, unlike other common epoxy esters of acrylic and methacrylic acids, they are readily soluble in ordinary aliphatic hydrocarbons, typical of which are those containing from 5 to 18 carbon atoms such as pentane, hexane, cyclohexane, octane, dodecane, and the like. Accordingly, the linear homopolymers or copolymers of this invention may be applied in the form of a solution in a suitable organic solvent in a thin film to a flat metal, glass or wooden surface. After drying at temperatures up to about 125° C. for about thirty minutes, the film is sometimes still tacky although sometimes hard and brittle and is quickly attached by and dissolved in β-ethoxyethyl acetate and other solvents. This film is valuable in instances where temporary coating protection is needed. After the need for the protection ceases the film is easily removed by solvents.

The secondary stage in the present method is achieved by heating the linear homopolymer or copolymer formed in the first stage in a temperature range from about 60° to 180° C., preferably from 80° to 150° C., more specially in the presence of one or more of the catalysts described above. Higher temperatures may be required when it is desired to disperse with the catalyst. The heating time ranges preferably from 15 minutes to one hour depending to some extent on the individual polymer concerned and to a greater extent on the temperature employed. Generally, the higher the temperature used the shorter the time needed. In any case, heating is continued until conversion of the solvent-soluble linear polymer (homopolymer of copolymer) is converted to a solvent-insoluble space or three-dimensional homopolymer or copolymer. This polymer is valuable as a decorative and protective covering for preferably flat materials, particularly wood and metal. One practical way of achieving a film of the polymer on a desired surface is to apply to the surface a film of the first stage or linear polymer and then applying heat to the film so that the temperature ranges between 175° to 300° C. The heating of the film in the desired temperature range should be continued until the first stage or linear polymer is completely converted to the second stage or cross-linked polymer. Usually, fifteen minutes to one hour is sufficient time to effect this conversion, as has been previously described. The completion of the conversion from the first stage to the second stage polymer can be observed from the condition of the film. The first stage polymer is dissolved by organic solvents such as toluene and β-ethoxyethyl acetate, whereas the second stage polymer is substantially harder than the first stage polymer and is not dissolved by organic solvents. The first stage or linear polymers of the present invention, and especially those containing 5 to 20 mole percent of at least one compound of Formula I and from 80 to 95 mole percent of at least one other type of monoethylenically unsaturated compound, especially the alkyl acrylates and methacrylates having from 1 to 18 carbon atoms in the alkyl groups, may be applied from solutions to the surfaces of refrigerator cabinets, washing machines, stoves, kitchen cabinets, and so on to form a coating thereon which is then converted to an insoluble, hard cross-linked resin which may form the main component of a protective enamel for such surfaces containing pigments, dulling agents, and so on. Those polymers which are of tough, rubbery character are useful as wire coatings, as in dish racks for drying dishes, etc.

An aspect of our invention which comes under special consideration is the stabilization of protein containing textiles by impregnating them with a specific aqueous emulsion of the type described further below and then heating the textiles at a temperature which is at least 110° to 150° C. or even to 180° C., but below the charring temperature of the textile. The polymerized emulsion provides a linear polymer which can be made to polymerize predominantly through the vinyl group. When the textile material is saturated with this emulsion and heated it is believed that cross-linking occurs which does not involve only the epoxide group but also apparently the proteinaceous portion of the textile. Accordingly, the copolymer appears not merely deposited but chemically bound to the fibers. As a result, the resinous polymer is not leached or removed from the textile during washing or dry cleaning operations. Moreover, the unusual qualities of the epoxy group in our monomer allow for better control of the reaction and also appear to promote fuller bonding of the polymer and the textile during curing. The freedom of irritating and toxic properties on skin is an advantage of particular significance in textile treatment since in such operations constant exposure to the aqueous emulsions is hardly avoidable.

Another advantage of the monomers of this invention is their surprisingly greater stability in emulsions than other common reactive monoepoxyacrylates. Whereas such common materials tend to rapidly degrade and lose their epoxy content with a resulting loss of their ability to shrink-proof textile materials, the monomers of this invention are considerably more stable in such emulsions. They consistently maintain a high epoxy content and accordingly retain their effectiveness in shrink-proofing textiles over a long period of time.

In textile stabilization, the emulsions of our invention, which are employed, are copolymerizable mixtures which invariably contain at least one of the compounds of Formula I and alkyl esters of acrylic and methacrylic acids which have the general formula $CH_2=CR-COOR'$ in which R is a hydrogen atom (in which case the esters are those of acrylic acid) or a methyl group (in which case the esters are those of methacrylic acid) and in which R' is a straight- or branched-chain alkyl group of one to eight carbon atoms. Examples of the alkyl group which are represented by R' in the above formula include methyl, ethyl, propyl, isopropyl, n-butyl, sec-butyl, tert-butyl, n-octyl and 2-ethylhexyl groups as well as the isomers of these radicals. It should be pointed out that a softer hand is obtained when the alkyl group of the acrylic or methacrylic acid ester is a straight chain group.

Also, emulsions containing alkyl esters of acrylic acid ordinarily impart a softer hand or feel to the treated wool-containing textile. In order to obtain the fullest benefit of the monomers of this invention in the treatment of textiles, the monomers of Formula I should be employed in proportions ranging from 3 to 30% and preferably from 8 to 15%, based on the total weight of the copolymerizable materials in the monomeric mixture.

The emulsions which are employed in the process of this invention are prepared by agitating a copolymerizable mixture of the two kinds of monomeric ingredients in an aqueous solution of an emulsifying or dispersing agent and an activator for the copolymerization. A wide variety of emulsifying agents including the well recognized cationic, anionic, and non-ionic surface-active agents can be used. An emulsifying agent of the non-ionic type is, however, recommended. The mixture is copolymerized at a temperature from 0° to 100° C., and preferably from about 10° to about 50° C., in the presence of a catalyst system of the redox type discussed above. The amount of catalyst may vary but for purposes of efficiency from 0.01% to 1.0%, based on the weight of the monomers, of the peroxidic agent and the same or lesser proportions of the reducing agent are recommended. In this way, it is possible to prepare emulsions which contain as little as 1% and as much as 60% of the resinous copolymer on a weight basis. It is, however, more convenient and practical—and hence preferred—to produce emulsions which contain about 15–35% resins solids.

The emulsion is deposited on the textile material by such means as exhausting, spraying, or dipping. What is required is that the textile material be saturated and impregnated by the emulsion. This can be done at any desired temperature up to the boiling point of the emulsion. Ordinarily, the textile is padded at room temperature with an emulsion which has been adjusted to a resin-content of about 1% to 20%. The material being treated must pick up or take up and then retain sufficient emulsion to provide from 1% to about 20%—and preferably from 3% to 12%—of the copolymer, based on the weight of the dry textile.

The impregnated textile material must then be heated at a temperature of 110° C. or higher—preferably at a temperature from 110° C. to about 150° C. or even to 180° C.—in order to effect cure; that is, to effect chemical reaction between the textile and the copolymer, and to impart dimensional stability to the former. Drying of the emulsion-treated textile and the heat-treatment which effects the chemical reaction can be carried out in one step, or the textile can be dried at a conveniently lower temperature and then heated later at the higher temperature.

In the following examples, which are merely illustrative of the polymers of this invention and their valuable applications, the parts are by weight unless otherwise specified.

*Example 7(a)*

A homopolymer of 2-methacryloylmethyl-5,6-epoxy-bicyclo[2.2.1]heptane is prepared by charging 100 parts of this monomer with 0.05 parts of azobis(isobutyronitrile) in a heavy walled glass tube which is hereafter sealed under vacuum. Heating to 60° C. is applied for 16 hours, followed by 75° C. for one hour and 110° C. for an hour. Final curing is accomplished by heat treatment at 180° C. for 45 minutes. The resulting polymer is a clear hard plastic having a Vicat softening temperature of 72° C. under a load of 1 kg. and for 10 ml. penetration.

*Example 7(b)*

A similar procedure is followed to polymerize 2-methacryloyl-5,6-epoxybicyclo[2.2.1]heptane, 2 - acryloyl-5,6-epoxybicyclo[2.2.1]heptane, 2 - methacryloylmethyl - 2-methyl-5,6-epoxybicyclo[2.2.1]heptane, and 2-acryloylmethyl - 5,6 - epoxybicyclo[2.2.1]heptane. There are obtained clear solid polymers. A solution of 2-methacryloylmethyl-5,6-epoxybicyclo[2.2.1]heptane in toluene is made from 100 parts of each and 0.60 part of benzoyl peroxide. It is charged in a vessel in which it is heated at 110° C. for 12 hours. The polymer separates from the solution. This polymer is further copolymerizable through opening of the epoxides and heating in the presence of 0.50 part of boron trifluoride ethyl etherate complex at a temperature of 160° C. for 2 hours.

Similarly, 2-methacryloyl-5,6-epoxybicyclo[2.2.1]heptane is polymerized in a suitable solvent.

*Example 8*

Fifty-eight parts of 2-methacryloyl-5,6-epoxybicyclo[2.2.1]heptane, 41 parts of methacrylic acid, and 523 parts of methyl methacrylate are mixed with 0.14 part of benzoic peroxide and 0.31 part of linseed oil, fatty acids, and 0.62 part of lecithin. The charge is heated with stirring to 75° C. and thus partially copolymerized to a viscous syrup. This syrup is evacuated to remove any dissolved gas and poured into an elongated glass cell preheated to 65° C. No gelation is noticeable. The casting is then placed in an oven and heated for two days at 110° C. The mold is allowed to cool. The resulting thermoplastic sheet separates easily from the mold. It has good surface quality. Specimen bars cut from this sheet are heated, treated at 180° C. and annealed. The resulting specimens have a heat distortion temperature of 118° C. The specimens are insoluble in chloroform.

Likewise, thermosetting sheets are prepared from 3,4-epoxyhexahydrobenzyl acrylate with equivalent results. In a like manner, comparable results are obtained with other monomers of the present invention. Similar thermosetting sheets are obtainable from the 20 parts of 2-methacryloyl - 5,6 - epoxybicyclo[2.2.1]heptane, 20 parts of methacrylic acid, and 80 parts of methyl methacrylate.

*Example 9*

The following components are placed in a 500-ml. flask equipped with a mechanical agitator and thermometer:

(a) 90 parts of n-butyl acrylate
10 parts of 2-methacryloylmethyl-5,6-epoxybicyclo[2.2.1]heptane
300 parts of water
6 parts of a non-ionic dispersing agent, a 70% aqueous of tert-octylphenoxyethoxyethanol The contents of the flask were cooled to 15° C. and there were added 0.12 gram of ammonium persulfate and 0.16 gram of sodium hydrosulfite. Although there was direct contact of the aqueous emulsion with the skin, no erythema was observed.

(b) In a similar manner, ethyl acrylate, methyl methacrylate, octyl acrylate, and hexyl acrylate are copolymerized with 2 - acryloylmethyl - 5,6 - epoxybicyclo[2.2.1]heptane. Also, 20 parts of 2-methacryloyl-5,6-epoxybicyclo[2.2.1]heptane are copolymerized with 80 parts of ethyl acrylate in the presence of a suitable non-ionic dispersing agent in water. Other monomers of this invention, including 2 - methacryloylmethyl - 2methyl-5,6-epoxybicyclo[2.2.1]heptane, 2 - acryloylmethyl-6-methyl-5,6 - epoxybicyclo[2.2.1]heptane, and 2 - methacryloyl-5-methyl - 5,6 - epoxybicyclo[2.2.1]heptane, are similarly emulsion polymerized. Similar useful emulsions for textile treatment are obtainable with the other epoxy methacrylates and epoxy acrylates of this invention. In none of the cases were there observed skin irritation which are experienced with glycidyl methacrylate emulsions.

The effectiveness of the emulsion in stabilizing wool is determined by impregnating measured pieces of flannel with the emulsions, drying, and heating the impregnated pieces of flannel at a temperature of 240° F. or higher, laundering the pieces in hot water, then drying them and measuring the shrinkage. In these tests, pieces of Botany woolen flannel (style #405; 2/2 right hand 45° twill, 55 x 44; S-twist in ends, Z in picks; scoured, carbonized, neutralized and peroxide-bleached) are used. All pieces are 10 inches square, with axes along the yard systems. The pieces of flannel are padded with a pad liquor of emulsion which was so adjusted in solids-content as to provide the desired amount of resins-solids (1%–20% based on the weight of the dry flannel) at a pick-up of about 75; that is, when the flannel contained the emulsion in an amount equal to about 75% of the weight of the dry flannel. The thus-treated specimens are dried and heated and cured at a temperature of at least 240° F. The specimens are washed, together with untreated pieces of flannel, in a Cascade wheel washer containing 10 gallons of water and 70 grams of soap (Ivory). In all cases the load in the washer was made up to three pounds with cotton toweling and the temperature was maintained at 140° F. The experimental error in tests of this kind is about ±2%.

The above emulsion is diluted to a 5% resin-content and test pieces of flannel are prepared therefrom in the following ways:

Test pieces are padded through the above emulsion. The pick-up is 3.5% resin (dry resin on dry flannel). Test pieces are dried 10 minutes at 240° F. and cured 10 minutes at 300° F.

The results of these tests show that the test pieces of flannel treated with the emulsions of this invention virtually remained unchanged. The textile pieces also show good stability to ultraviolet light. They do not stiffen, degrade or discolor on ageing or on exposure to ultraviolet light as do comparable textiles which have been treated, for example, with latices of butadiene copolymers.

Emulsions prepared under (b) are applied to flannel pieces. The results of wash tests indicate that satisfactory dimensional stability can be imparted to the wool.

We claim:

1. A compound of the Formula I

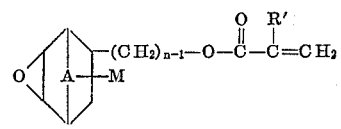

where M is selected from the group consisting of a hydrogen atom and at least one methyl group, R' is selected from the group consisting of a hydrogen atom and a methyl group, $n$ is an integer having a value of 1 to 2, and A is methylene.

2. A compound of Formula I in which R' is methyl.
3. A compound of Formula I in which R' is a hydrogen atom.
4. A compound of Formula I in which $n$ is 1.
5. A compound of Formula I in which $n$ is 2.
6. 2-methacryloyl-5,6-epoxybicyclo[2.2.1]heptane.
7. 2-acryloyl-5,6-epoxybicyclo[2.2.1]heptane.
8. 2 - methacryloylmethyl - 5,6 - epoxybicyclo[2.2.1]heptane.

9. 2-acryloylmethyl-5,6-epoxybicyclo[2.2.1]heptane.
10. A compound of the formula

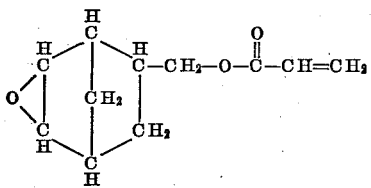

11. A compound of the formula

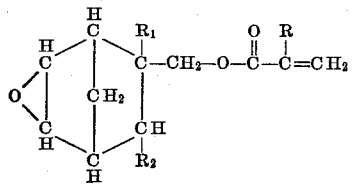

wherein R, $R_1$ and $R_2$ are selected from the group consisting of hydrogen and methyl.

12. A homopolymer of a compound of claim 1.
13. A copolymer of a compound of claim 1 and a monoethylenically unsaturated compound copolymerizable therewith, in the ratio of 5 to 95 parts by weight of the former to 95 to 5 parts of the latter.
14. A copolymer of a compound of claim 1 and an alkyl ester of an acid selected from the group consisting of acrylic and methacrylic acids the alkyl group of said ester containing 1 to 8, inclusive, carbon atoms, in the ratio of 5 to 95 parts by weight of the former to 95 to 5 parts of the latter.
15. A homopolymer of the compound of claim 5.

References Cited by the Examiner

UNITED STATES PATENTS

| | | | |
|---|---|---|---|
| 2,687,406 | 8/1954 | Foster | 260—348 |
| 2,771,470 | 11/1956 | Mark | 260—348 |
| 2,838,479 | 6/1958 | Biletch | 260—89.5 X |
| 2,883,398 | 4/1959 | Frostick et al. | 260—348 |

FOREIGN PATENTS 1,136,434   12/1956   France.

JOSEPH L. SCHOFER, *Primary Examiner.*

DANIEL ARNOLD, MILTON STERMAN, IRVING MARCUS, GEORGE F. LESMES, PAUL HELLER, JAY FRIEDENSON, *Assistant Examiners.*